(12) United States Patent
Kagawa

(10) Patent No.: US 7,403,311 B2
(45) Date of Patent: Jul. 22, 2008

(54) NETWORK FACSIMILE DEVICE

(75) Inventor: Tetsuya Kagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 785 days.

(21) Appl. No.: 09/978,754

(22) Filed: Oct. 16, 2001

(65) Prior Publication Data

US 2002/0048048 A1    Apr. 25, 2002

(30) Foreign Application Priority Data

Oct. 20, 2000 (JP) .............................. 2000-320886

(51) Int. Cl.
H04N 1/04 (2006.01)

(52) U.S. Cl. ...................... 358/474; 358/1.15; 358/404; 358/402; 379/100.12; 379/93.07

(58) Field of Classification Search ................ 358/402, 358/1.15, 407, 403, 434, 468, 442, 400; 379/93.23, 379/93.24, 100.09, 100.08, 93.07, 100.12, 379/217

See application file for complete search history.

(56) References Cited

U.S. PATENT DOCUMENTS

| | | | | |
|---|---|---|---|---|
| 5,072,401 A | * | 12/1991 | Sansone et al. ............. | 700/219 |
| 6,097,792 A | * | 8/2000 | Thornton .................... | 379/88.2 |
| 6,330,070 B1 | * | 12/2001 | Toyoda et al. .............. | 358/1.15 |
| 6,384,927 B1 | * | 5/2002 | Mori ........................ | 358/1.15 |
| 6,417,930 B2 | * | 7/2002 | Mori ........................ | 358/1.15 |
| 6,470,379 B1 | * | 10/2002 | Mori ........................ | 709/206 |
| 6,594,032 B1 | * | 7/2003 | Hiroki et al. ............... | 358/1.15 |
| 6,603,569 B1 | * | 8/2003 | Johnson et al. ............. | 358/1.15 |
| 6,625,642 B1 | * | 9/2003 | Naylor et al. ............... | 709/206 |
| 6,683,698 B2 | * | 1/2004 | Toyoda et al. .............. | 358/1.15 |
| 6,700,674 B1 | * | 3/2004 | Otsuka et al. .............. | 358/1.15 |
| 6,707,580 B1 | * | 3/2004 | Bloomfield ................. | 358/402 |
| 6,710,894 B1 | * | 3/2004 | Ogawa ...................... | 358/1.15 |
| 6,781,721 B2 | * | 8/2004 | Toyoda et al. .............. | 358/402 |
| 6,823,367 B1 | * | 11/2004 | Wakasugi et al. ........... | 709/206 |
| 6,825,947 B1 | * | 11/2004 | Asai ......................... | 358/1.18 |
| 6,836,789 B1 | * | 12/2004 | Toyoda ...................... | 709/206 |
| 6,836,792 B1 | * | 12/2004 | Chen ........................ | 709/220 |
| 6,882,438 B1 | * | 4/2005 | Kanaya ..................... | 358/1.15 |
| 6,897,985 B1 | * | 5/2005 | Toyoda ...................... | 358/402 |
| 6,906,829 B1 | * | 6/2005 | Kisono ...................... | 358/407 |
| 6,922,255 B1 | * | 7/2005 | Tomida ..................... | 358/1.15 |
| 6,956,663 B1 | * | 10/2005 | Iida .......................... | 358/1.15 |
| 2003/0018730 A1 | * | 1/2003 | Mori ........................ | 709/206 |
| 2004/0190053 A1 | * | 9/2004 | Okada et al. ............... | 358/1.15 |
| 2007/0168557 A1 | * | 7/2007 | Henry ....................... | 709/246 |

FOREIGN PATENT DOCUMENTS

| | | |
|---|---|---|
| JP | 1141275 | 2/1999 |
| JP | 11234328 | 8/1999 |
| JP | 11261628 | 9/1999 |

* cited by examiner

Primary Examiner—Edward L. Coles
Assistant Examiner—Negussie Worku
(74) Attorney, Agent, or Firm—Cooper & Dunham, LLP

(57) ABSTRACT

A network facsimile device capable of Simple Mail Transfer Protocol (SMTP) receiving, via a network, electronic mail (email) to which facsimile image data is attached, the network facsimile device includes domain registration means for registering a domain of an address of the network facsimile device, and email address registration means for registering a plurality of email addresses indicating the network facsimile device. The network facsimile device receives email when an address attached to such email is the network facsimile device domain and is one of the plurality of email addresses registered in the email address registration means.

10 Claims, 10 Drawing Sheets

FIG.3

| REGISTERRED EMAIL ADDRESS | NETWORK FACSIMILE DEVICE DOMAIN |
|---|---|
| Abcde@fgh.ijk.lmn | fgh.ijk.lmn |
| Bcdef@fgh.ijk.lmn | |
| Cdefg@fgh.ijk.lmn | |
| ⋮ | |
| ⋮ | |

FIG.6

| RECEIVED EMAIL ADDRESS | FORWARDING ADDRESS |
|---|---|
| Abcde@fgh.ijk.lmn | 03-1234-5678 |
| Bcdef@fgh.ijk.lmn | 03-2345-6789 |
| Cdefg@fgh.ijk.lmn | 03-3456-7890 |
| ⋮ | ⋮ |
| ⋮ | ⋮ |

FIG.9

| RECEIVED EMAIL ADDRESS | SENDER DATA OF JUST RECEIVED EMAIL |
|---|---|
| Abcde@fgh.ijk.lmn | From a123@bcd.efg.hij |
| Bcdef@fgh.ijk.lmn | From b234@cde.com |
| Cdefg@fgh.ijk.lmn | From c345@def.ac.jp |
| ⋮ | ⋮ |
| ⋮ | ⋮ |

NETWORK FACSIMILE DEVICE

BACKGROUND OF THE INVENTION

1. Field of the Invention

The present invention concerns a local area network facsimile device having the capability to send and receive electronic mail (email) via a local area network (LAN) or the internet as well as the capability to send and receive facsimile data via a public network as part of the facsimile transmission process.

2. Description of the Conventional Art

A conventional network facsimile device, also known as a network fax, connects to the internet and is communications capable. In addition to having the capability to transmit facsimiles via a public network as part of the facsimile transmission process, such a network facsimile device also has an address conversion table, in which sub-address data received through the facsimile transmission process and network addresses that correspond to the sub-address data are matched and stored. Accordingly, the network facsimile device can take image data received via the public network and transmit, via a LAN, to a communications terminal of the network address corresponding to the sub-address data sent to the network facsimile device from the sender's communications terminal at the time the image data was transmitted. Additionally, if the LAN that is connected to the network facsimile device is further connected to the internet, then the aforementioned network facsimile device can send and receive image data and email to and from other communications terminals connected to a different LAN, via the LAN, internet or intranet, as the case may be.

For example, if the type of transmission used in the aforementioned network facsimile device is the so-called store and forward type, then transmission data from the sender's network facsimile device is temporarily stored in the buffer memory of a mail server such as a Simple Mail Transfer Protocol (SMTP) server where an error check is performed, after which the transmission data is forwarded onward.

As electronic mail reception protocols, there exist that protocol in which email is received directly from the aforementioned SMTP server as well as the so-called Post Office Protocol, or POP, in which email is periodically retrieved from a POP server. When using POP as the email reception protocol, the email address is registered in the facsimile terminal. From among the mail delivered to the aforementioned mail server a user then receives that which matches the user's own email address.

By contrast, a facsimile terminal that uses SMTP as the mail reception protocol, although there is a possibility that email other than that having the email address that is registered in the facsimile terminal may be sent thereto, reception of email other than that of the terminal setting email is restricted.

It should be noted that Japanese Laid-Open Patent Application No. 11-41275, Japanese Laid-Open Patent Application No. 11-234328 and Japanese Laid-Open Patent Application No. 11-261628 teach that which is related to the above-described types of devices.

Thus, for example, Japanese Laid-Open Patent Application No. 11-41275 discloses a method in which, of the registered addresses used to send and receive email, those that are unneeded are automatically deleted. Similarly, Japanese Laid-Open Patent Application No. 11-234328 discloses a method for sending and receiving email when connected to a mail server or accessing a home page. Likewise, Japanese Laid-Open Patent Application No. 11-261628 discloses a method for confirming that email has been sent after sending or receiving email via SMTP.

However, the above-described conventional art entails a drawback. Specifically, when receiving electronic mail using SMTP, it is not possible to register a plurality of email addresses in the network facsimile device's own domain. As a result, even when a plurality of users use the same network facsimile device, that network facsimile device is unable to receive email having an address different from the one email address for that device, which is inconvenient.

SUMMARY OF THE INVENTION

Accordingly, it is an object of the present invention to provide a network facsimile device in which the above-described drawback of the conventional art is eliminated. More specifically, it is an object of the present invention to provide a network facsimile device capable of registering a plurality of email addresses in the devices own domain as SMTP reception addresses.

The above-described object of the present invention is achieved by a network facsimile device capable of Simple Mail Transfer Protocol (SMTP) receiving, via a network, electronic mail (email) to which facsimile image data is attached, the network facsimile device comprising:

domain registration means for registering a domain of an address of the network facsimile device; and email address registration means for registering a plurality of email addresses indicating the network facsimile device, the network facsimile device receiving email when an address attached to such email is the network facsimile device domain and is one of the plurality of email addresses registered in the email address registration means.

According to the above-described invention, in a case in which, for example, a single network facsimile device (network facsimile) is used by a plurality of users, it is possible to register email addresses for each user. As a result, electronic mail addressed to individual users can be received at the same network facsimile device. Such a capability enables the network facsimile device to provide a wider range of network access options tailored to the needs of individual users, thus enhancing the operating capabilities of the network facsimile device and making it more attractive to use.

Additionally, the above-described object of the present invention is also achieved by the network facsimile device as described above, further comprising forwarding address registration means for matching and registering the plurality of email addresses indicating the network facsimile device with the forwarding addresses for forwarding email sent to any one of the plurality of email addresses, wherein the network facsimile device forwards electronic mail to a recipient whose forwarding address corresponds to the email address of the received email sent to the network facsimile device.

The network facsimile device of the future will likely function as a gateway between facsimile communications that use existing telephone lines and email communications that use the internet. According to the above-described invention, the network facsimile device registers the forwarding address of the electronic mail addressed to individual users, so electronic mail can be forwarded to a given address between the internet and the network fax.

Additionally, according to the above-described invention, email can be sent as facsimile data over telephone lines, enabling the network facsimile device to function as a gateway between internet and line transmission as described above, thus enhancing the operating capabilities of the network facsimile device and making it more attractive to use.

Additionally, the above-described object of the present invention is also achieved by the network facsimile device as described above, further comprising sender data acquisition and registration means for acquiring and registering data relating to the sender of email sent to the network facsimile device, wherein the network facsimile device forwards the data relating to the sender at the same time as the network facsimile device forwards email to a recipient whose forwarding address corresponds to that of the email address of the received email sent to the network facsimile device.

According to the above-described invention, when forwarding received email to the above-described forwarding recipient, sender data is also forwarded as well, so the ultimate recipient of the communication can easily obtain information about the original sender, Additionally, according to the above-described invention, a plurality of email addresses cane be set in the network facsimile device, so email addresses can be provided for each one of a plurality of users and desired email can be retrieved. Such a capability enables the network facsimile device to provide a wider range of network access options tailored to the needs of individual users, thus enhancing the operating capabilities of the network facsimile device and making it more attractive to use.

Additionally, the above-described object of the present invention is also achieved by the network facsimile device as described above, wherein data relating to the sender includes the sender's email address and the network facsimile device forwards email to a recipient's email address using the sender's email address as a parameter.

According to the above-described invention, when forwarding received email to a forwarding recipient, by adding a particularly important sender's email address to a portion of the forwarded data as for example a G3 facsimile transmission parameter, the ultimate recipient of the transmission can easily ascertain the original sender of the transmission, thus enhancing the operating capabilities of the network facsimile device and making it more attractive to use.

These and other objects, features, aspects and advantages of the present invention will become better understood and more apparent from the following description, appended claims and accompanying drawings.

BRIEF DESCRIPTION OF THE DRAWINGS

FIG. 3 is a diagram illustrating registration by a network facsimile device email address storage unit according to a first embodiment of the present invention;

FIG. 6 is a diagram illustrating registration by a forwarding address storage unit according to a second embodiment of the present invention;

FIG. 9 is a diagram illustrating registration by a sender data storage unit according to a third embodiment of the present invention.

DESCRIPTION OF THE PREFERRED EMBODIMENTS

A description will now be given of embodiments of the present invention, with reference to the accompanying drawings. It should be noted that identical or corresponding elements are given identical or corresponding reference numbers in all drawings, with detailed descriptions thereof given once and thereafter omitted.

A description will now be given of a network facsimile device according to a first embodiment of the present invention.

Figure 1:
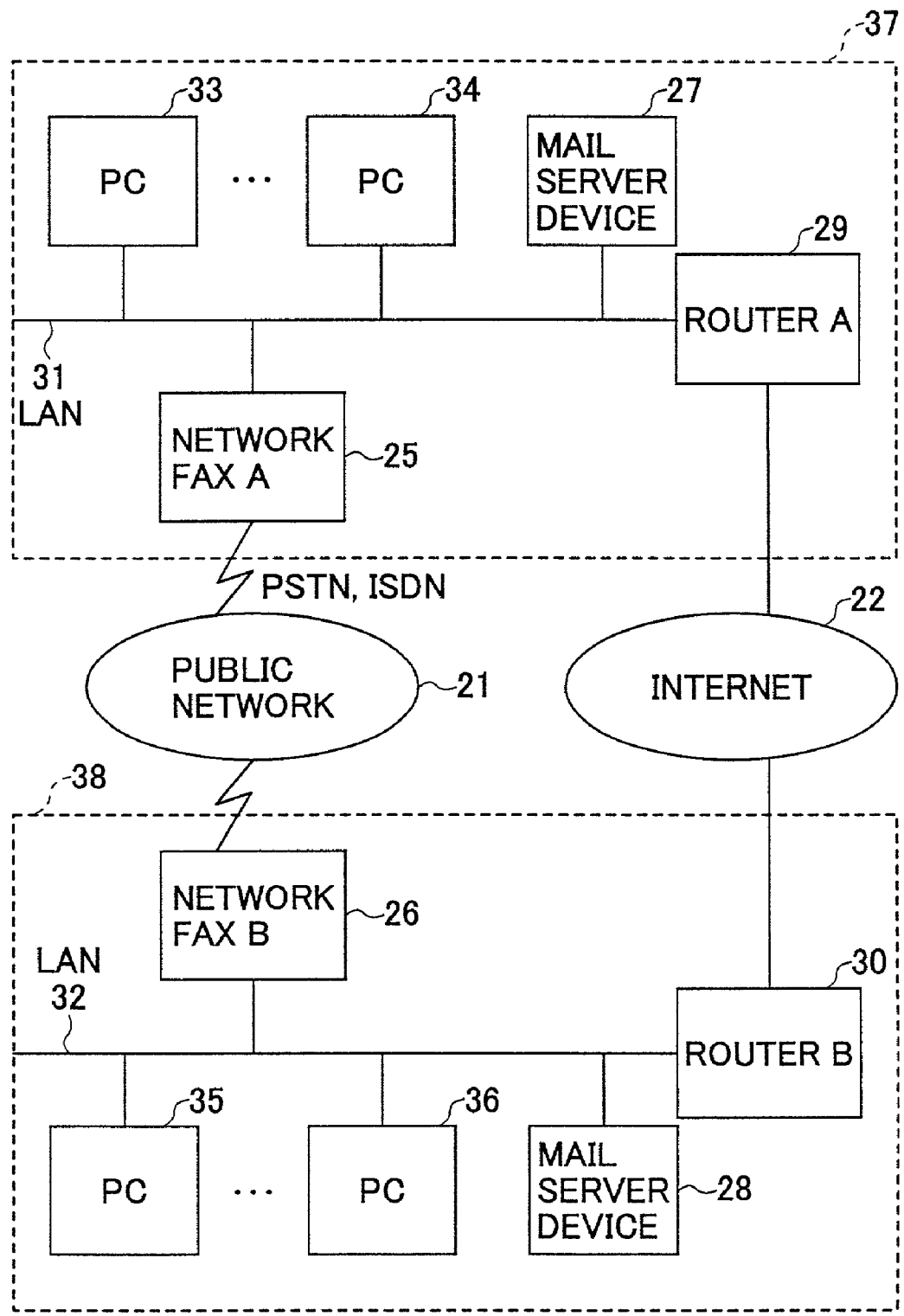
FIG. 1 is a block diagram of a communications system according to a first embodiment of the present invention.
Figure 2:
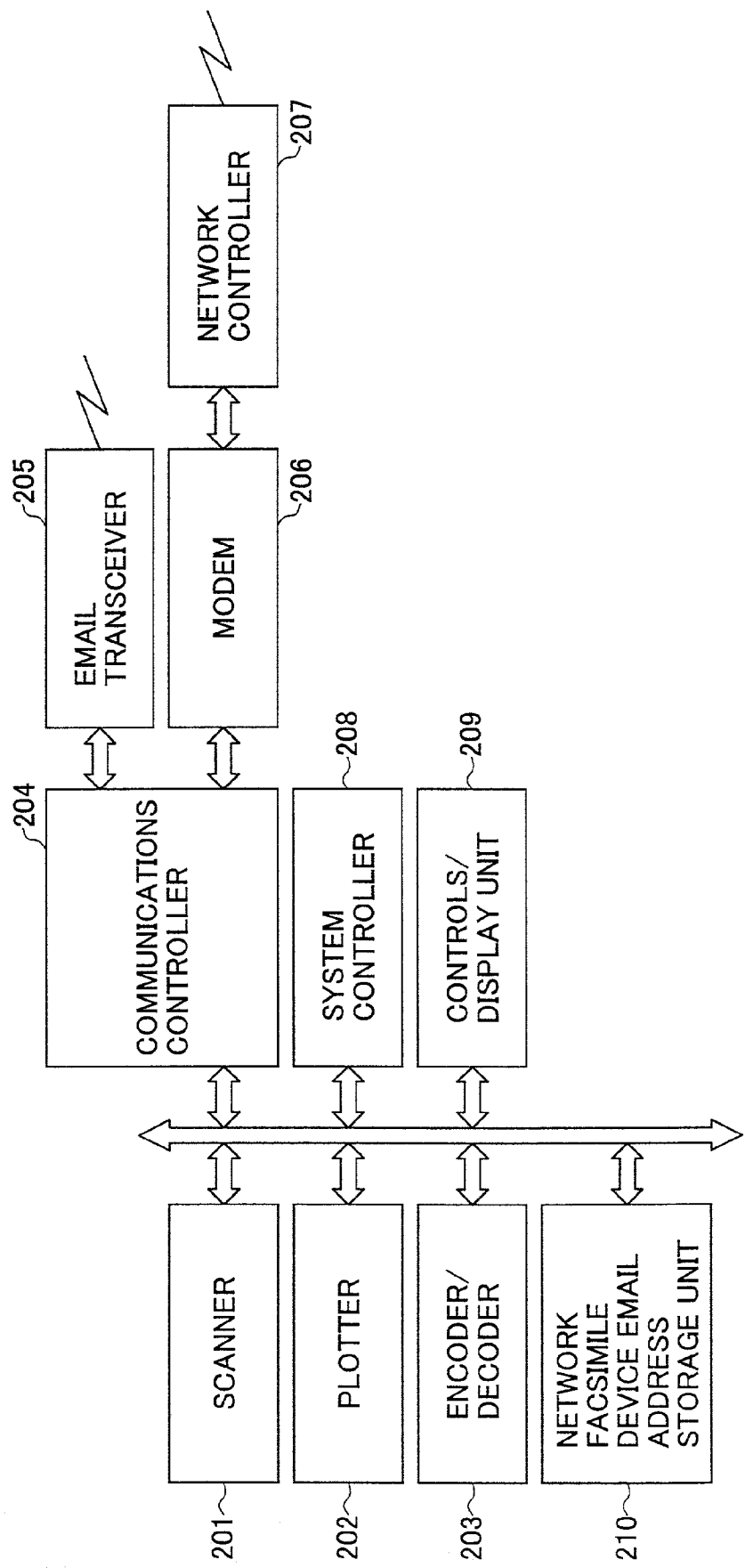
FIG. 2 is a block diagram of a network facsimile device according to a first embodiment of the present invention.

FIG. 1 is a block diagram of a communications system according to a first embodiment of the present invention. FIG. 2 is a block diagram of a network facsimile device according to a first embodiment of the present invention. It should be noted that the composition shown in FIG. 2 is common to network facsimile devices 25, 26.

The above-described communications system includes a domain 37 comprising chiefly a LAN 31 and a domain 38 comprising a LAN 32. The domains 37, 38 are connected by dedicated lines to an internet 22 service provider (not shown in the drawing) via routers 29, 30, respectively. Specific network addresses that are divided using a net mask of predetermined value on previously distributed network addresses are set in the domains 37, 38, so data transfer can be conducted between the domains 37, 38 via the routers 29, 30 and the internet 22.

Additionally, a mail server device 27 is provided in the domain 37. The mail server device 27 provides email service to the network facsimile device 25 and to a plurality of personal computers (PC) 33, 34 connected to the LAN 31. A specific host address that links the specific email address to a network address of the domain 37 is set for each of the PC 33, 34, the network facsimile device 25 and the mail server 27. A user using the domain 37 is assigned a specific user name and a user address linked to one or the other of either the PC 33 or the PC 34.

Similarly, a mail server device 28 is provided in the domain 38. The mail server device 28 provides email service to the network facsimile device 26 and to personal computers (PC) 35, 36 connected to the LAN 32. A specific host address that links the specific email address to a network address of the domain 38 is set for each of the PC 35, 36, the network facsimile device 26 and the mail server 28. A user using the domain 37 is assigned a specific user name and a user address linked to one or the other of either the PC 35 or the PC 36.

The network facsimile devices 25, 26 are connected to the LAN 31, 32, are equipped with the capability to send and receive image data as email, and are connected to a public network 21 and equipped to send and receive image data via G3 facsimile transmission. A combination of a transmission protocol up to the transport layer called TCP/IP (Transmission Control Protocol/Internet Protocol) and a communications protocol for the layer above that is employed for the sending and receiving of data between terminals connected to the LAN 31, 32 and the sending and receiving of data via the internet 22. Thus, for example, SMTP is the upper layer communications protocol used for sending and receiving email data, while email itself is sent and received using a store and forward type transmission configuration, which temporarily accumulates email in the mail servers 27, 28 and then forwards the email. Thus, for example, when sending an email from a domain 37 user to a domain 38 user, the email is temporarily stored in the mail server device 27 before being sent to the internet 22 via the router 29 and then stored in the mail server device 28 of the domain 38 via the internet 22 and the router 30.

The PC 33-36 and network facsimile devices 25, 26 query the mail server devices 27, 28 (SMTP server) at predetermined periods and, when email addressed to such users is stored in the mail server devices 27, 28, receive the email from the mail server devices 27, 28. It should be noted that the network facsimile devices 25, 26 handle the email address set to the network facsimile devices 25, 26 themselves as a sub-address.

In FIG. 2, a system controller 208 controls the operation of the entire device, that is, controls facsimile transmission. A system memory (not shown in the drawing) stores both a control program that the system controller 208 executes as well as a variety of data needed to execute the control program. Additionally, the system memory is also used as a work area.

The system memory also stores an address conversion table, in which sub-address data received through the facsimile transmission process and network addresses that correspond to the sub-address data are matched and stored.

A parameter memory (not shown in the diagram) stores a variety of data specific to the network facsimile devices. A clock circuit (not shown in the drawing) outputs the current time.

The scanner 201 reads an image surface of a document at a predetermined resolution, and records and outputs image data at a predetermined resolution. A controls/display unit 209 comprises a variety of control keys and displays, and acts as an interface with the user. The control/display unit 209 is used to control the device and to set the mode of the device based on the capabilities of the communications terminal used by the other party to the transmission. In particular, in the present embodiment, the internal settings of the network facsimile device email address storage unit 210 can be changed at will using the controls/display unit 209.

An encoder/decoder 203 compresses and encodes image signals and decodes compressed encoded image signals to obtain the original signal. An image accumulator (not shown in the diagram) stores a multiplicity of image data in a compressed encoded state.

A modem 206 provides a modem function for the G3 facsimile. The modem 206 has a low-speed function (V.21 modem) for sending and receiving transmission process signals as well as a high-speed function (v.17 modem, V.34 modem, V.29 modem. V.27 modem, etc.) for sending and receiving mainly image data, and modulates and demodulates analog signals.

A network controller 207 is provided in order to connect the network facsimile device to the public network (PSTN) 21, and is equipped with an automatic send and receive function.

An email transceiver (including a LAN interface) 205 connects the network facsimile device to the LAN 31, 32, and performs email communications.

A communications controller 204 performs communications control using a predetermined protocol such as a G3 facsimile process in order to send and receive image data between different communications terminals (facsimile devices) via the public network 21. The communications controller also performs communications control of a predetermined protocol suite in order to send and receive a variety of data between different communications terminals via the LAN 31, 32 as well as the internet 22.

The network facsimile device email address storage unit 210 exists for the purpose of registering the network facsimile device domain and the plurality of email addresses that the network facsimile device is capable of receiving (for example, the email addresses of all the users of the network facsimile device). A more specific description of the operation of the network facsimile device email address storage unit 210 follows, with reference to FIG. 3.

FIG. 3 is a diagram illustrating registration by a network facsimile device email address storage unit according to a first embodiment of the present invention.

As shown in FIG. 3, the network facsimile device domain "fgh@ijk.lmn" and for example the reception email addresses for each user "Abcde@fgh.ijk.lmn", "Bcdef@fgh.ijk.lmn" and "Cdefg@fgh.ijk.lmn" are rewritably registered. Accordingly, all email sent to the email addresses previously registered in the network facsimile device email address storage unit 210 can be received from the SMTP server.

As can be appreciated by those skilled in the art, the present embodiment is not limited to the foregoing configuration but may, for example, be configured so as to register the above-described address conversion table, the above described network facsimile device domain and the plurality of email addresses for which email can be received together in the above-described system memory. With such a configuration, table searches and setting changes can be carried out efficiently.

The above-described system controller 208, the scanner 201, a plotter 202, the controls/display unit 209, the encoder/decoder 203 and the network facsimile device email address storage unit 210 are connected to the system bus, with data transmission between individual units being carried out mainly via the system bus. Data transmission between the network controller 207 and the modem 206, and between the communications controller 204 and the email transceiver 205, is carried out directly.

A description will now be given of the method of transmitting and receiving email in the communications system according to the present embodiment, with reference to FIG. 4. It should be noted that the example used here is that of a (multipart-type) transmission of email from the network facsimile device 25 to the network facsimile device 26

Figure 4:
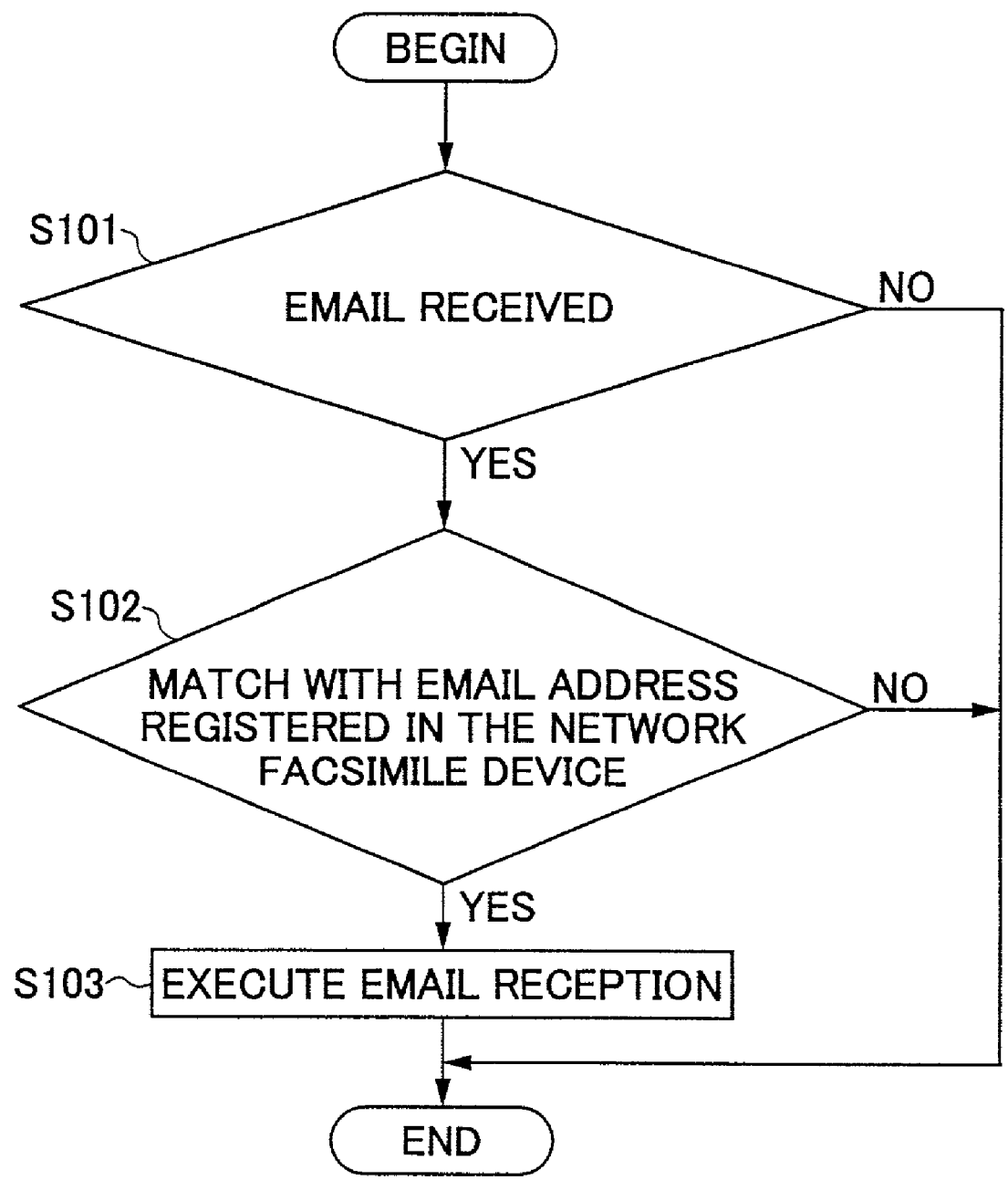
FIG. 4 is a flow chart showing a communications operation of a network facsimile device according to a first embodiment of the present invention.

FIG. 4 is a flow chart showing a communications operation of a network facsimile device according to a first embodiment of the present invention.

First, the network facsimile device 25 converts either the image data read by the scanner 201, the transmission signal from the G3 facsimile device sent via the public network or facsimile data transmitted from the PC 33, 34 on the LAN 31 to TIFF (Tag Image File Format).

Next, the TIFF file so obtained is attached to an email according to MIME (Multipurpose Internet Mail Extensions) specifications. The network facsimile device 25 then checks the address conversion table contained in the system memory described above, converts the recipient's telephone number to a mail address, and inserts the mail address into the "To" field in the header of the email. Next, the network facsimile device 25 checks the network facsimile device email address storage unit 210 and inserts the sender's email address (including one or the other of either the network facsimile device domain or the plurality of email addresses capable of being received) in the "From" field. Similarly, the network facsimile device 25 inserts a descriptive message title in the "Subject" field, supplies a fixed value of "1.0" to the "MIME-Version" field and indicates MIME multipart type in the "Content-Type" field.

Thereafter, the network facsimile device 25 transmits an email addressed to the network facsimile device 26 to the mail server device 27 using the SMTP.

At this point, in a typical transmission process between the network facsimile device 25 and the LAN 31 mail server device 27 using SMTP, a TCP (Transmission Control Protocol) connection is established from the network facsimile device 25 to the mail server device 27, a HELO command from the network facsimile device 25 announces that the transmission path has begun to be used, and the network facsimile device 25 confirms that both sides of the mail server 27 have been initialized. Then an email process is requested with a MAIL command from the network facsimile device 25, a recipient is specified using recipient command "RCPT", and sending of the message itself begins with a DATA command. Next, when transmission of the message is completed, the network facsimile device 25 transmits a transmission complete command, after which the network facsimile device 25 awaits a response from the mail server device 27, requests that the connection be broken, and then breaks the TCP connection.

Then, the network facsimile device 26, as shown in FIG. 4, queries the mail server device 28 at predetermined periods. When the network facsimile device 26 determines that an email has been sent thereto ("yes" at a step S101), the network facsimile device 26 then checks the network facsimile device email address storage unit 210 to determine if anything matches the address of the email that has been received. If there is a match ("yes" in a step S102), then the network facsimile device 26 determines that there is email addressed to the user, receives (in a step S103) the email from the mail server device 28 and prints output to the plotter 202.

As can be appreciated by those skilled in the art, the present embodiment is not limited to the above-described configuration but may also comprise a case in which, for example, the network facsimile device receives email stored in the mail server device on the reception side from a PC on another LAN via a transmission side mail server device, a router, the internet and a reception side router as well, and ascertains whether the email received is addressed to a user registered in the network facsimile device email address storage unit 210.

Additionally, together with the capability to receive SMTP email with facsimile image data attached via a network such as the LAN 31, 32, the network facsimile devices 25, 26 of the present embodiment are also provided with at least the network facsimile device email address storage unit 210 that registers a network facsimile device domain and a plurality of email addresses (registered email addresses) indicating the network facsimile device. As a result, it becomes possible to register a plurality of email addresses for individual users of the network facsimile device domain, and when the address attached to the SMTP-received email is one of the email addresses previously registered in the network facsimile device domain, can receive email so addressed.

It should be noted that the network facsimile device email address storage unit 210 corresponds to the above-described domain registration means of the claims and the above-described address registration means of the claims.

A description will now be given of a network facsimile device according to a second embodiment of the present invention, with reference in the first instance to FIG. 5.

Figure 5:
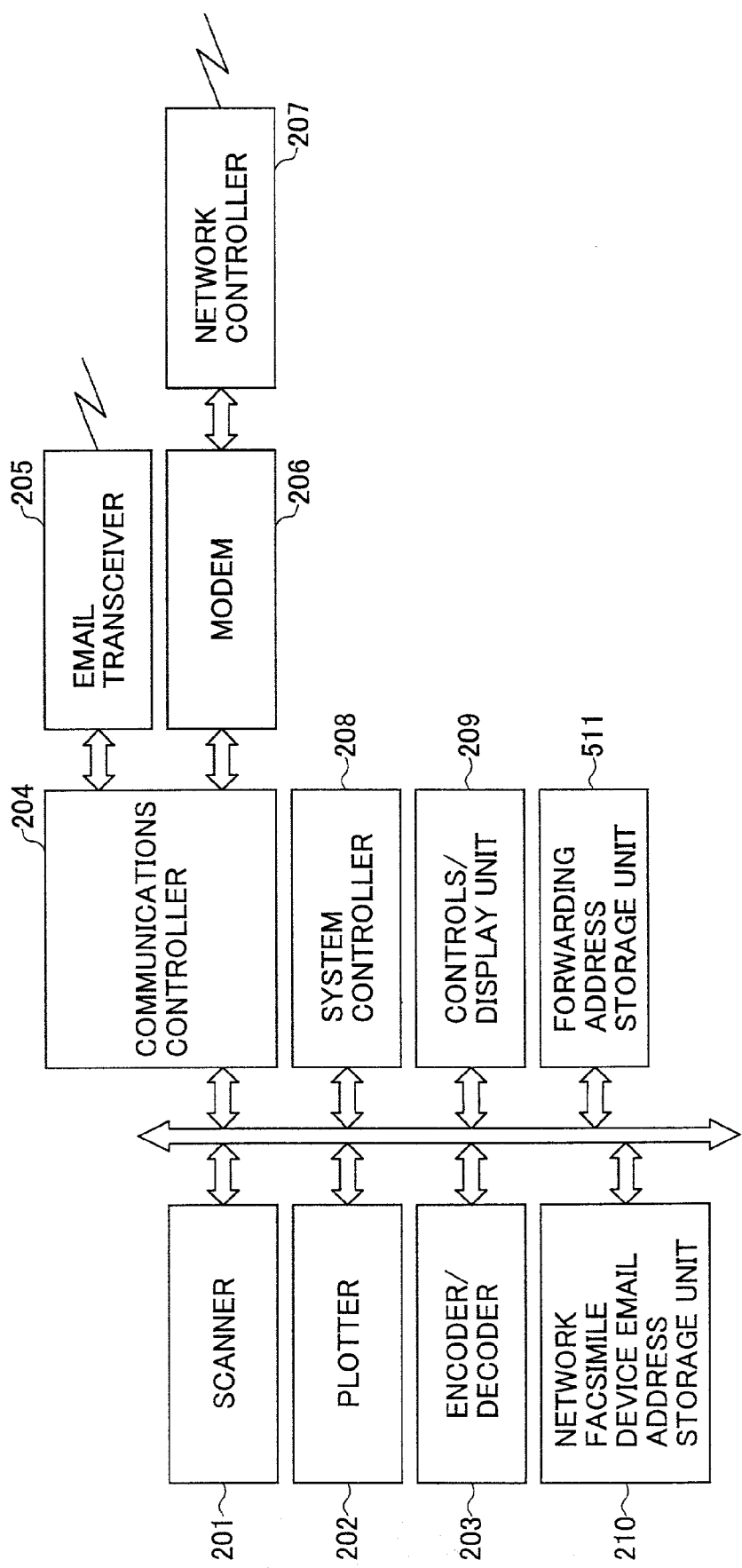
FIG. 5 is a block diagram of a network facsimile device according to a second embodiment of the present invention.

FIG. 5 is a block diagram of a network facsimile device according to a second embodiment of the present invention.

In addition to the above-described capability to receive email using SMTP as with the network facsimile device according to the first embodiment as described above, the network facsimile device according to the second embodiment also has the network facsimile device email address storage unit 210 for registering the network facsimile device domain and the plurality of email addresses indicating the network facsimile device (the registered email addresses). At the same time, as shown in FIG. 5, the network facsimile device according to the second embodiment of the present invention also has a forwarding address storage unit 511 for matching and registering a plurality of email addresses indicating the network facsimile device with forwarding addresses for forwarding each of the emails addressed to the email addresses. With such a configuration, email sent to the network facsimile device can be forwarded to forwarding addresses corresponding to those email addresses, and the network facsimile devices 25, 26 can be used as gateways between facsimile communications using existing telephone lines and email communications using the internet.

It should be noted that the forwarding address storage unit 511 corresponds to the forwarding address registration means for matching and registering the plurality of email addresses indicating the network facsimile device with the forwarding addresses for forwarding email sent to one of the plurality of email addresses, as described in the claims.

In FIG. 5, the forwarding address storage unit 511 rewritably registers telephone numbers of forwarding addresses corresponding to each of the plurality of receivable email addresses registered in the network facsimile device email address storage unit 210. The internal settings of the forwarding address storage unit 511 can be reset at will using the controls/display unit 209.

A more specific description of the operation of the forwarding address storage unit 511 follows, with reference to FIG. 6.

FIG. 6 is a diagram illustrating registration by a forwarding address storage unit according to a second embodiment of the present invention.

As shown in FIG. 6, received email addresses "Abcde@fgh.ijk.lmn", "Bcdef@fgh.ijk.lmn" and "Cdefg@fgh.ijk.lmn" are matched with and registered in the forwarding address storage unit 511 with forwarding addresses "03-1234-5678", "03-2345-6789" and "03-3456-7890" to which the email transmitted to the above-described received email addresses should be forwarded, on a one-to-one basis.

As can be appreciated by those skilled in the art, the present embodiment is not limited to the above-described configuration but may also comprise a configuration in which a plurality of forwarding addresses are matched with a single received email address and so registered. With such a method, the mail server devices 27, 28 can transmit the same email to the plurality of forwarding addresses.

Similarly, the present embodiment may also comprise a configuration in which the contents of the network facsimile device email address storage unit 210 and the forwarding address storage unit 511 (the network facsimile device domain, the registered email address, the forwarding address) are combined in a single table and rewritably registered therein. With such a configuration, table searches and setting changes can be carried out efficiently.

A description will now be given of the method of transmitting and receiving email in the communications system according to the present embodiment, with reference to FIG. 7.

Figure 7:
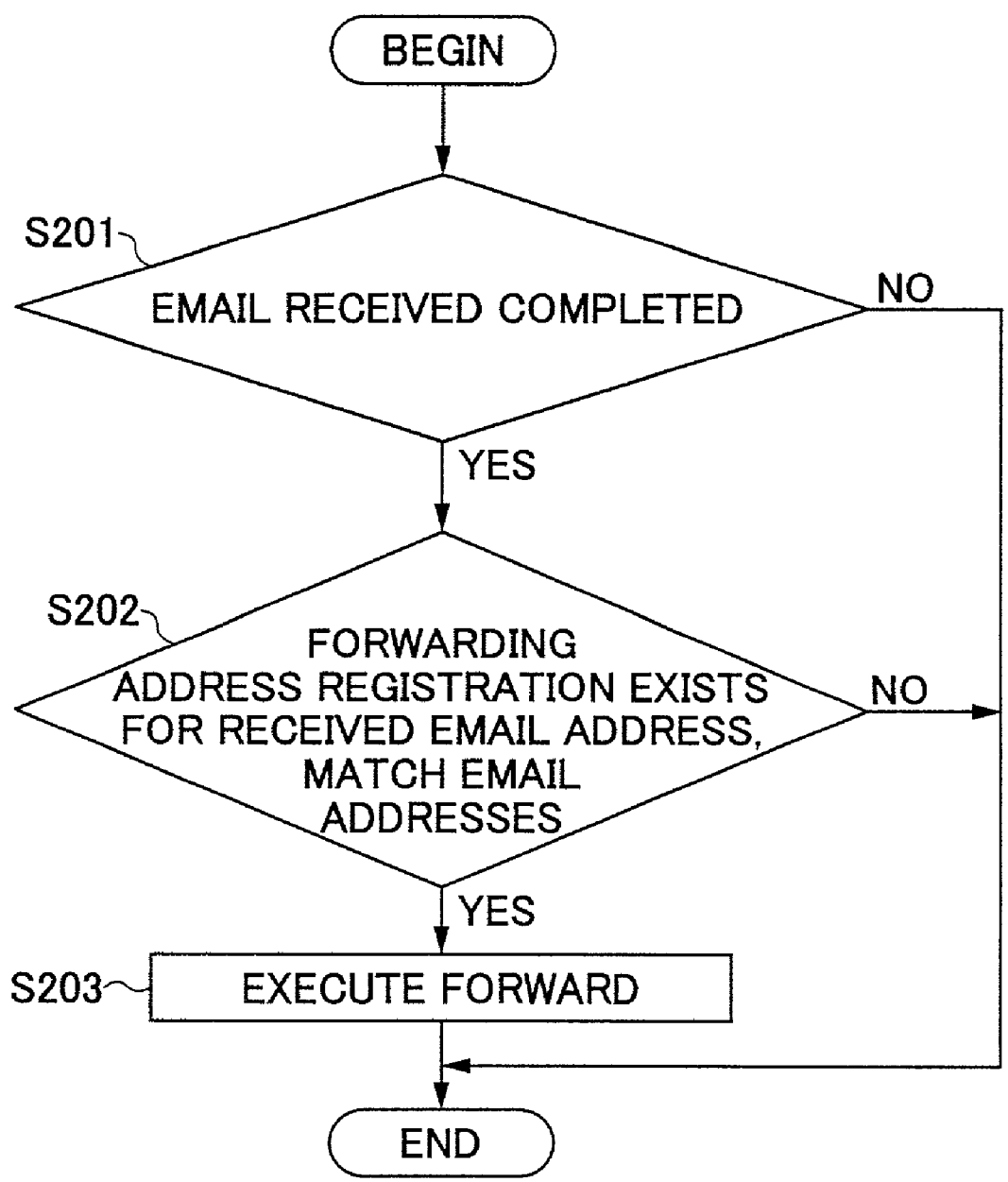
FIG. 7 is a flow chart showing a communications operation of a network facsimile device according to a second embodiment of the present invention.

FIG. 7 is a flow chart showing a communications operation of a network facsimile device according to a second embodiment of the present invention.

As with the network facsimile device according to the first embodiment of the present invention as described above, when the network facsimile device 26, has or receives email from the network facsimile device 25 or from the PC 35, 36 on the other LAN 32 via the mail server device 27 on the sending side, the router 29, the internet 22 and the receiving-side router 30 at the mail server device 28 on the receiving side using SMTP, the network facsimile device 26 checks the network facsimile device email address storage unit 210 and determines whether or not there is anything in the facsimile device email address storage unit 210 that corresponds to the address on the aforementioned email. If as a result of that search the network facsimile device 26 determines that email addressed to such user is being stored, then the network facsimile device 26 receives the email from the mail server device 28.

Next, as shown in FIG. 7, when email receipt is completed ("yes" in a step S201), the network facsimile device 26 checks the forwarding address storage unit 511 and, if there exists therein anything that matches the mail address of the received email ("yes" in a step S202), then in a step S203 the network facsimile device 26 forwards the aforementioned received email to the forwarding address that is registered in the forwarding address storage unit 511 and which corresponds to such matching email address.

A description will now be given of a network facsimile device according to a third embodiment of the present invention, with reference in the first instance to FIG. 8.

Figure 8:
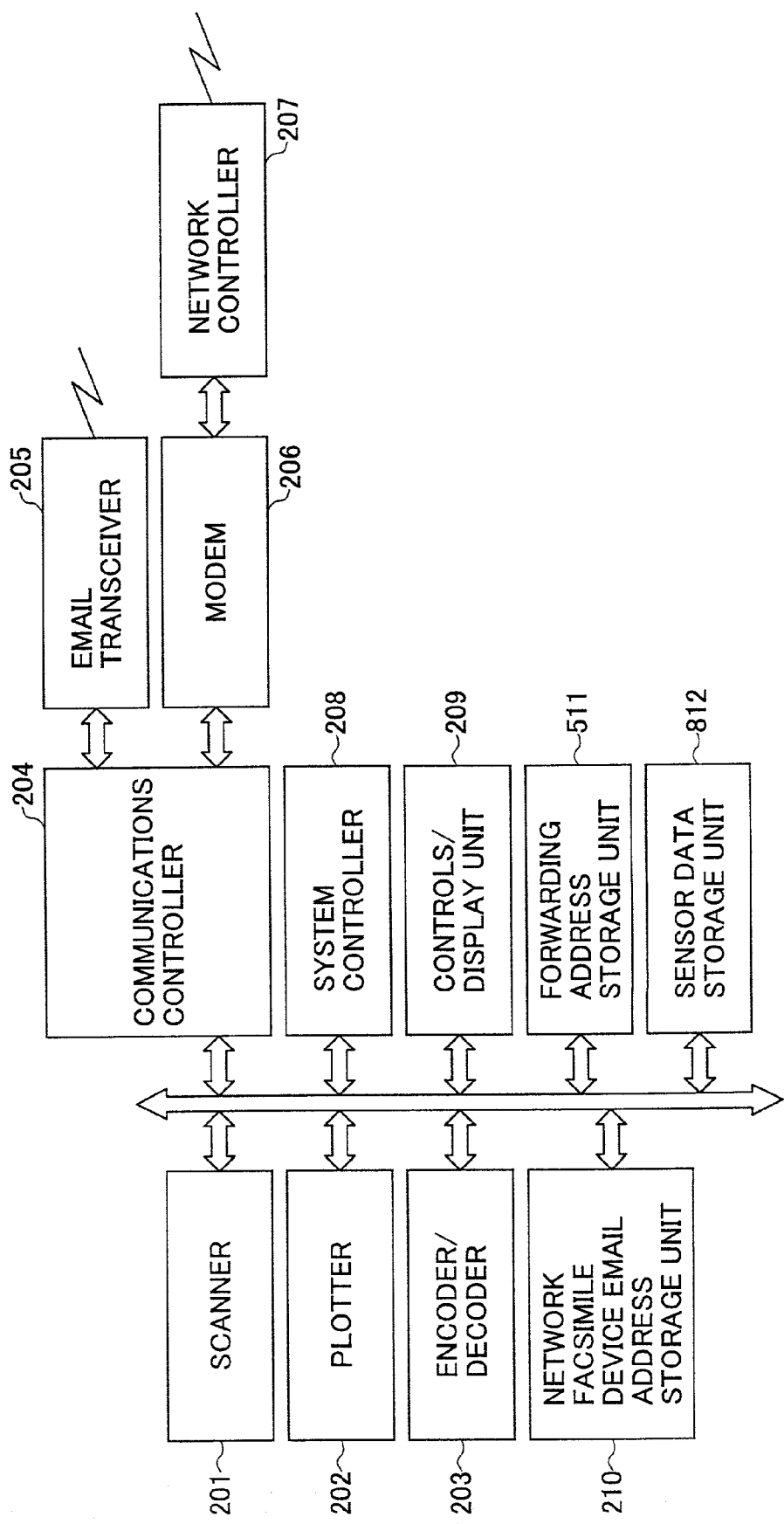
FIG. 8 is a block diagram of a network facsimile device according to a third embodiment of the present invention.

FIG. 8 is a block diagram of a network facsimile device according to a third embodiment of the present invention.

As shown in FIG. 8, the network facsimile device according to the third embodiment comprises not only the above-described capability to receive email using SMTP as with the network facsimile device according to the first embodiment as described above, the network facsimile device email address storage unit 210 for registering the network facsimile device domain and the plurality of email addresses indicating the network facsimile device (the registered email addresses), and the forwarding address storage unit 511 for matching and registering a plurality of email addresses indicating the network facsimile device with forwarding addresses for forwarding each of the emails addressed to the email addresses as described above with the respect to the network facsimile device according to the second embodiment of the present invention. In addition, as shown in FIG. 8, the network facsimile device according to the third embodiment of the present invention also comprises a sender data storage unit 812 that acquires and registers data relating to the sender of the email sent to the network facsimile device from the email received at the network facsimile device. With this configuration, for example, the sender's email address can be sent as a parameter to the above-described forwarding address when forwarding the email itself. In this case, the ultimate recipient of the email so forwarded can easily identify the sender.

It should be noted that the sender data storage unit 812 corresponds to the sender data acquisition and registration means for acquiring and registering data relating to the sender of email sent to the network facsimile device, as described in the claims.

As shown in FIG. 8, the sender data storage unit 812 matches and rewritably registers each of the plurality of receivable email addresses registered in the network facsimile device email address storage unit 210 with sender data (sender's email address and so forth) received immediately prior to transmission to the email addresses. The internal settings of the sender data storage unit 812 can be changed at will using the controls/display unit 209.

A more specific description of the operation of the sender data storage unit 812, with reference to FIG. 9.

FIG. 9 is a diagram illustrating registration by a sender data storage unit according to a third embodiment of the present invention.

As shown in FIG. 9, received email addresses "Abcde@fgh.ijk.lmn", "Bcdef@fgh.ijk.lmn" and "Cdefg@fgh.ijk.lmn" are matched with and registered in the sender data storage unit 812 with sender data received immediately prior to the sending of the received email addresses "From al23@bcd.efg.hij", "From b234@cde.com" and "From c345 @ def.ac.jp", respectively, on a one-to-one basis.

As can be appreciated by those skilled in the art, the present embodiment is not limited to the above-described configuration but may also comprise a configuration in which contents of the sender data storage unit 812 (the network facsimile device domain, the registered email addresses, the forwarding addresses and the sender data received immediately preceding transmission of the received email addresses) are combined in a single table and rewritably registered therein. With such a configuration, table searches and setting changes can be carried out efficiently.

A description will now be given of the method of transmitting and receiving email in the communications system according to the present embodiment, with reference to FIG. 10.

Figure 10:
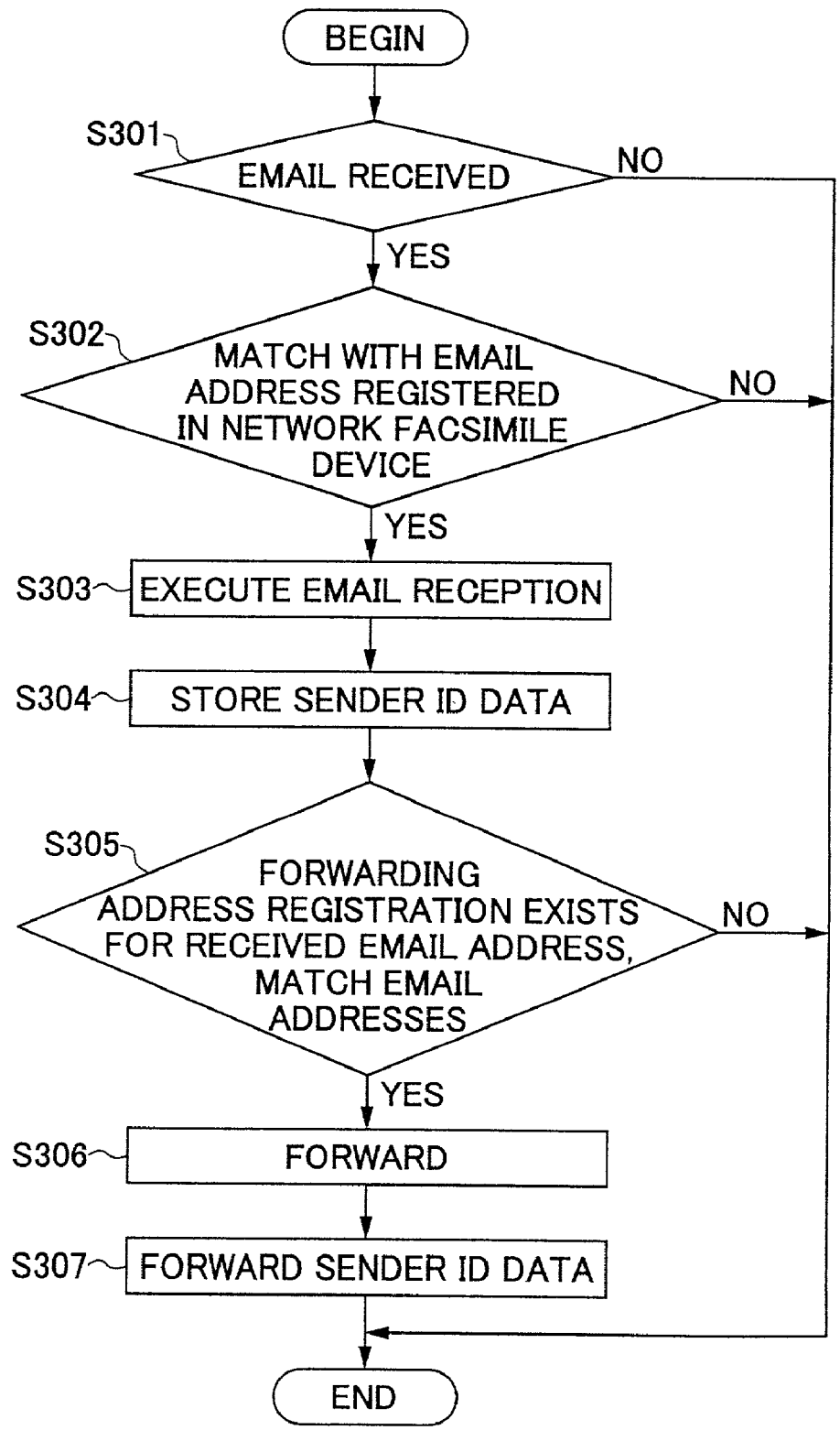
FIG. 10 is a flow chart showing a communications operation of the network facsimile device according to a third embodiment of the present invention.

FIG. 10 is a flow chart showing a communications operation of the network facsimile device according to a third embodiment of the present invention.

As with the network facsimile device according to the first embodiment of the present invention as described above, when the network facsimile device 26 has or receives email from the network facsimile device 25 or from the PC 35, 36 on the other LAN 32 via the mail server device 27 on the sending side, the router 29, the internet 22 and the receiving-side router 30 at the mail server device 28 on the receiving side using SMTP ("yes" at a step S301), the network facsimile device 26 checks the network facsimile device email address storage unit 210 and determines whether or not there is anything in the facsimile device email address storage unit 210 that corresponds to the address on the aforementioned email in a step S302. If as a result of that search the network facsimile device 26 determines that email addressed to such user is being stored, then in a step S303 the network facsimile device 26 receives the email from the mail server device 28.

In a step S304, the network facsimile device 26 then matches the sender email address attached to the received email against the received email addresses of the sender data storage unit 812 and rewritably registers the sender email address as just-received sender data (sender identification data, or sender ID data).

Thus, for example, if the email address of the received email described above is "Abcde@fgh.ijk.lmn" and the sender's email address (the sender data of the email just received) is "al23@bcd.efg.hij", then "Abcde@fgh.ijk.lmn" and "From a123@bcd.efg.hij" are paired and rewritably registered in the sender data storage unit 812.

Next, the network facsimile device 26 checks the forwarding address storage unit 511 for anything that matches the email address of the email and, if there is a match ("yes" in a step S305"), forwards the received email in a step S306. At the same time, the network facsimile device 26 also reads the sender email address corresponding to the email address of the received email (the sender data of the email just received)

from the sender data storage unit 812 and (in a step S307) forwards the sender email address together with the email to the corresponding forwarding address using the sender address as an email forwarding parameter.

For example, if the address to which the email is sent (the received email address) is "Abcde@fgh.ijk.lmn", then the network facsimile device 26 retrieves the forwarding address corresponding to the mail address "Abcde@fgh.ijk.lmn" (in this case, "03-1234-5678") from the forwarding address storage unit 511 and at the same time retrieves the sender's email address of email corresponding to "Abcde@fgh.ijk.lmn" (the sender data just received) from the sender data storage unit 812 and transmits the email as well as the sender data "a123@bcd.efg.hij" from the network facsimile device 26 to "03-1234-5678". At the same time, the network facsimile device 26 also transmits sender data registered in the forwarding address storage unit 511.

It should be noted that when the sender email address and other data for identifying the sender stored in the sender data storage unit 812 are converted to image data, a method of transmission is used whereby such ID data is either buried in the transmitted image data or a transmission page is added and the ID data written to the added page. In particular, in a case in which the above-described sender's email address is transmitted as a parameter to a facsimile device, the ID data may be buried in the signal frame (RTI) that transmits an own-terminal data alphanumeric code that is the protocol signal for the G3 facsimile transmission process. By these methods, the sender's email address and any other ID data can be forwarded to a facsimile device (G3/G4 facsimile) or another email communications device.

As can be appreciated by those skilled in the art, although in the present embodiment the sender's email address is registered in the sender data storage unit 812 as data relating to the other party to the communication, it is also possible to register other types of data in the sender data storage unit 812 for purposes of identifying the sender. Such data may include the sender's telephone number, for example, or communications capacity data.

The above description is provided in order to enable any person skilled in the art to make and use the invention and sets forth the best mode contemplated by the inventor of carrying out the invention.

The present invention is not limited to the specially disclosed embodiments and variations, and modifications may be made without departing from the scope and spirit of the invention.

The present application is based on Japanese Priority Application No. 2000-320886, filed on Oct. 20, 2000, the entire contents of each of which are hereby incorporated by reference.

What is claimed is:

1. A network facsimile device comprising:
   Simple Mail Transfer Protocol (SMTP) receiving means for receiving, via a network, electronic mail (email) to which facsimile image data is attached;
   domain registration means for registering a domain of an address of the network facsimile device;
   email address registration means for registering a plurality of email addresses indicating the network facsimile device; and
   controlling means, wherein the controlling means determines whether the address attached to the email is in the network facsimile device domain and is one of the plurality of email addresses registered in the email address registration means, and controls the network facsimile device to receive the email when the address attached to the email is in the network facsimile device domain and is one of the plurality of email addresses registered in the email address registration means, and
   wherein the SMTP receiving means receives email addressed to the network facsimile device domain registered in the domain registration means and one of the plurality of email addresses registered in the email address registration means.

2. The network facsimile device as claimed in claim 1, further comprising forwarding address registration means for marching and registering the plurality of email addressees indicating the network facsimile device with the forwarding addresses for forwarding email sent to one of the plurality of email addresses,
   wherein the network facsimile device forwards electronic mail to a recipient whose forwarding address corresponds to the email address of the received email sent to the network facsimile device.

3. The network facsimile device as claimed in claim 2, further comprising sender data acquisition and registration means for acquiring and registering data relating to the sender of email sent to the network facsimile device,
   wherein the network facsimile device forwards the data relating to the sender at the same time as the network facsimile device forwards email to a recipient whose forwarding address corresponds to the email address of the received email sent to the network facsimile device.

4. The network facsimile device as claimed in claim 3, wherein data relating to the sender includes the sender's email address and the network facsimile device forwards email to a recipient's email address using the sender's email address as a parameter.

5. The network facsimile device of claim 1, wherein said plurality of registered email addresses are associated with respective forwarding addresses of respective users of said network facsimile device.

6. The network facsimile device of claim 1, wherein at least one of said plurality of registered email addresses is associated with a plurality of forwarding addresses.

7. The network facsimile device of claim 6, wherein when an email addressed to said one of said plurality of registered email addresses is received, the received email is forwarded to each of the plurality of forwarding addresses.

8. The network facsimile device of claim 1, wherein said plurality of email addresses are rewritably registered.

9. A network facsimile device capable of Simple Mail Transfer Protocol (SMTP) receiving, via a network, electronic mail (email) to which facsimile image data is attached, the network facsimile device comprising:
   an email address storage unit configured to register a domain of an address of the network facsimile device, and register a plurality of email addresses indicating the network facsimile device; and
   a controller, wherein the controller determines whether an address attached to an email is in the network facsimile device domain and is one of the plurality of email addresses registered in the email arddress storage unit, and controls the network facsimile device to receive the email when the address attached to the email is in the network facsimile device domain and is one of the plurality of email addresses registered in the email address storage unit.

10. The network facsimile device of claim 1, wherein said plurality of registered email addresses are addresses of respective users of said network facsimile device domain.

* * * * *